(12) United States Patent
Quinn et al.

(10) Patent No.: US 8,413,220 B1
(45) Date of Patent: Apr. 2, 2013

(54) SYSTEM AND METHOD FOR USER AUTHENTICATION

(75) Inventors: Chris Quinn, San Diego, CA (US); Anthony Creed, San Diego, CA (US); Kenichi Mori, Carlsbad, CA (US); Bennett R. Blank, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 1257 days.

(21) Appl. No.: 11/830,811

(22) Filed: Jul. 30, 2007

(51) Int. Cl.
*G06F 21/00* (2006.01)

(52) U.S. Cl. ............. 726/5; 726/2; 726/3; 726/4; 726/6; 726/7; 726/8; 709/225; 709/229; 713/168; 713/169; 713/170; 713/171; 713/172; 713/173; 713/174; 713/182; 713/183; 713/184; 713/185; 713/186

(58) Field of Classification Search .......... 713/182–186; 726/27–30, 2–8; 173/168–170, 182–186
See application file for complete search history.

(56) References Cited

U.S. PATENT DOCUMENTS

| | | | | |
|---|---|---|---|---|
| 5,559,961 | A * | 9/1996 | Blonder | 726/18 |
| 7,174,462 | B2 * | 2/2007 | Pering et al. | 713/182 |
| 7,292,680 | B1 * | 11/2007 | Simpson | 379/88.18 |
| 7,292,723 | B2 * | 11/2007 | Tedesco et al. | 382/159 |
| 7,827,204 | B2 * | 11/2010 | Heinzel et al. | 707/802 |
| 8,151,343 | B1 * | 4/2012 | Wang et al. | 726/19 |
| 2004/0030934 | A1 | 2/2004 | Mizoguchi et al. | |
| 2004/0230843 | A1 | 11/2004 | Jansen | |
| 2005/0134427 | A1 | 6/2005 | Hekimian | |
| 2007/0067295 | A1 * | 3/2007 | Parulski et al. | 707/7 |
| 2007/0074119 | A1 | 3/2007 | Komine et al. | |
| 2007/0094717 | A1 * | 4/2007 | Srinivasan et al. | 726/5 |
| 2007/0266428 | A1 | 11/2007 | Downes et al. | |
| 2007/0277224 | A1 * | 11/2007 | Osborn et al. | 726/2 |
| 2008/0046968 | A1 | 2/2008 | Cline et al. | |
| 2008/0104065 | A1 * | 5/2008 | Agarwal et al. | 707/6 |
| 2008/0222710 | A1 * | 9/2008 | Blagsvedt et al. | 726/7 |

OTHER PUBLICATIONS

Trevor Pering et al., Photographic Authentication Through Untrusted terminals, Apr. 7, 2002, UIST Submission.*
Bailey, K., Curran, K., Condell, J., "Evaluation of pixel-based steganography and stegodetection methods" Imaging Science Journal, vol. 52, No. 3, pp. 131-150, Jan. 2004.
Horiuchi, T., "Automatic Seal Verification by Evaluating Positive Cost", Fac. of Software & Inf. Sci., Iwate Prefectural Univ., Japan, 572-6, Sep. 10-13, 2001.

\* cited by examiner

*Primary Examiner* — Taghi Arani
*Assistant Examiner* — Josnel Jeudy
(74) *Attorney, Agent, or Firm* — Osha Liang LLP

(57) ABSTRACT

A method for user authentication involves initiating an authentication process, receiving images associated with the authentication process, selecting an image from the images to generate a selection; and obtaining authentication based on the selection, where the image is associated with the authentication process and sent prior to initiating the authentication process.

24 Claims, 7 Drawing Sheets

SYSTEM AND METHOD FOR USER AUTHENTICATION

BACKGROUND

Authentication is the act of establishing or confirming a user as authentic. Authenticating a user frequently includes verifying the user's identity. One common use of authentication is access control. In other words, a resource (i.e., a file, an application, a web site, a software program, a hardware device such as a computer system, a physical facility, a safe, a room, a filing cabinet, and/or anything else that needs to be secure), intended to be used only by authorized individuals, attempts to detect and exclude unauthorized users. Access to the resource is therefore controlled by insisting on an authentication process to establish, with some degree of confidence, the identity of the user.

Authentication is often achieved using one or more tests. A user must generate correct responses to the one or more tests in order to be authenticated. The correct responses may be initially defined when the user registers (e.g., creates a user profile) associated with the resource. Known authentication tests include passwords, personal identification numbers (PINs), and biometrics (e.g., fingerprints, voice recognition, retinal scans).

SUMMARY

In general, in one aspect, the invention relates to a method of user authentication. The method including initiating an authentication process; receiving a first plurality of images associated with the authentication process; selecting a first image from the first plurality of images to generate a first selection; and obtaining authentication based on the first selection, where the first image is associated with the authentication process and sent prior to initiating the authentication process.

In general, in one aspect, the invention relates to a method of authenticating a user. The method including receiving a request to initiate an authentication process; sending a first plurality of images comprising a first image in response to the request; receiving a first selection associated with the first image; and authenticating the user based on the first selection, where the first image is received and associated with the authentication process prior to receiving the request to initiate the authentication process.

In general, in one aspect, the invention relates to a method of authenticating a user. The method including receiving a request to initiate an authentication process; sending an image in response to receiving the request; receiving a test answer associated with the image; comparing the test answer with a template answer to generate a comparison; and authenticating the user based on the comparison, where the template answer and the image are received and associated with the authentication process prior to receiving the request to initiate the authentication process.

In general, in one aspect, the invention relates to a computer readable medium storing instructions to authenticate a user. The instructions including functionality to receive a request to initiate an authentication process; send a first plurality of images comprising a first image in response to the request; receive a first selection associated with the first image; and authenticate the user based on the first selection, where the first image is received and associated with the authentication process prior to receiving the request to initiate the authentication process.

In general, in one aspect, the invention relates to a system for authenticating a user. The system including an image repository configured to receive a first image associated with an authentication process prior to an execution of the authentication process; a user profile repository operatively connected to the image repository and configured to store a user profile associated with the first image and the authentication process prior to the execution of the authentication process; and an authentication engine operatively connected to the user profile repository and the image repository, and configured to initiate the execution of the authentication process to authenticate a user based on a selection of the first image by the user from a first plurality of images.

Other aspects of the invention will be apparent from the following description and the appended claims.

DETAILED DESCRIPTION

Figure 1:
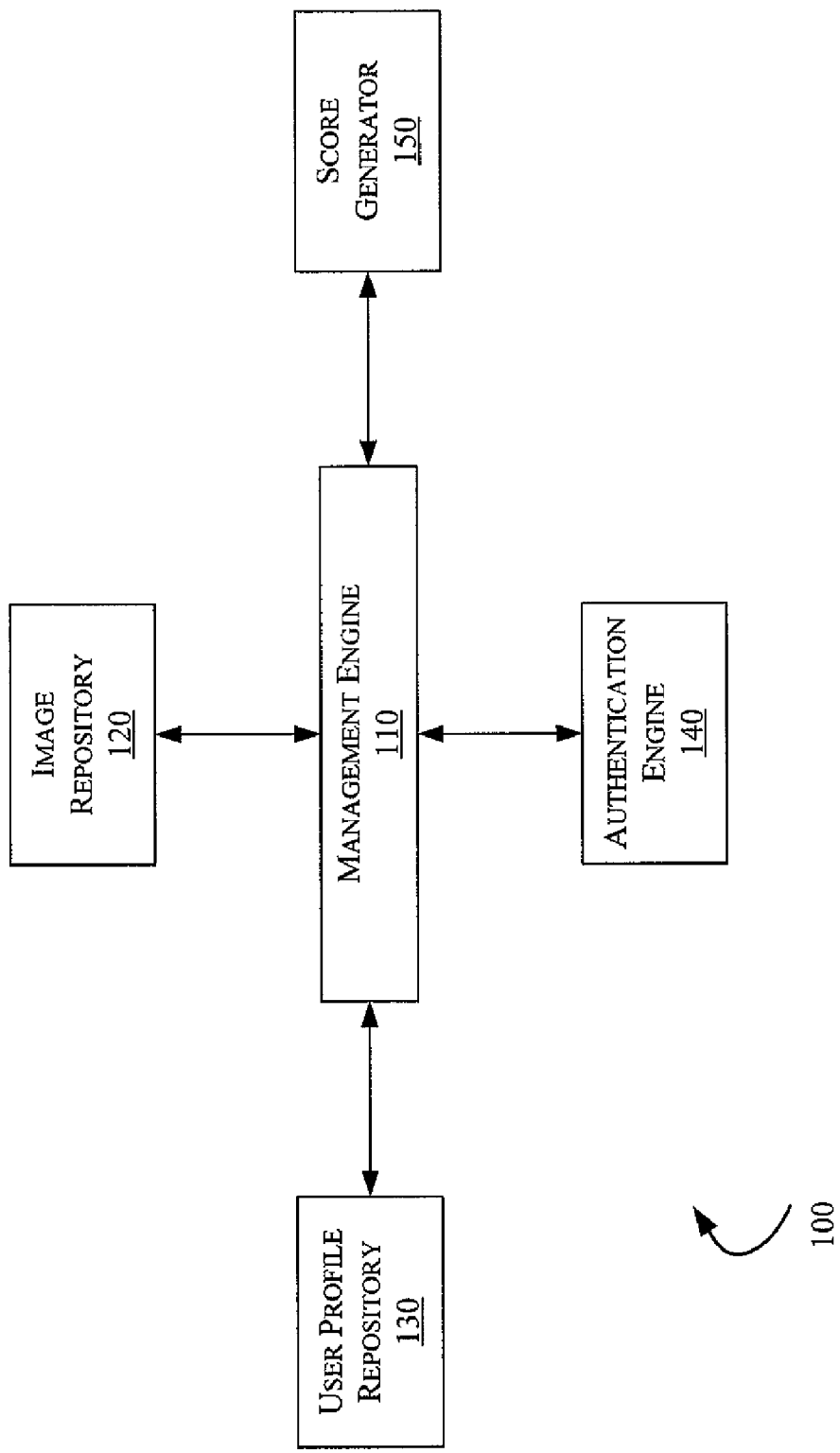
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method to authenticate a user. In general, embodiments of the invention provide a system and method to authenticate a user based on at least one of a selected image, a template answer associated with the selected image, and/or an ordering associated with the selected image.

FIG. 1 shows a system (100) in accordance with one or more embodiments of the invention. As shown in FIG. 1, the system (100) has several components including a management engine (110), an image repository (120), a user profile repository (130), an authentication engine (140), and/or a score generator (150). Each of these components is described below and may be located on the same device (e.g., a server, mainframe, desktop personal computer (PC), laptop, personal digital assistant (PDA), television, cable box, satellite box, kiosk, telephone, mobile phone, etc.) or may be located on separate devices connected by a network (e.g., the Internet), with wired and/or wireless segments.

In one or more embodiments of the invention, the system (100) may be configured to authenticate a user. The system (100) may be external to a resource (e.g., a file, an application, a web site, a hardware device, a physical facility, a safe, a room, a filing cabinet, and/or anything else that needs to be secure) requiring user authentication. Example applications include financial software (e.g., accounting software, tax preparation software, payroll software, banking software), medical provider software, insurance claim software, home inventory software, productivity software, document management software, e-commerce software, and/or other software requiring authentication. In such embodiments, the system (100) may be shared with multiple resources requiring user authentication. In one or more embodiments of the invention, the system (100) may be internal to a single resource and used only to authenticate users attempting to access said single resource.

In one or more embodiments of the invention, the image repository (120) stores one or more images. Each image in the image repository (120) may be associated with one or more tags used for categorizing the image (discussed below). Each tag may be a single attribute associated with the image. For example, each tag may describe content presented by the image (e.g., family members, vacation destinations, pets, schools, landmarks, cars, athletes, celebrities, political figures, etc.). In one or more embodiments of the invention, the one or more tags associated with an image are embedded as metadata within the image.

In one or more embodiments of the invention, each image in the image repository (120) may be associated with an image question and a template answer. The image question may be directed towards the contents and/or characteristics of the image (e.g., Where was this photograph taken? Why does the dog look so sad in this photograph? What family member is taking the photograph? What camera is being used to take the photograph? What is this image about? What is the source of this image? etc.) The template answer is the correct answer to the image question.

In one or more embodiments of the invention, words/phrases in the template answer that are essential in answering the image question are assigned points. The more essential the word/phrase in answering the image question, the greater the number of points assigned to said word/phrase. In one or more embodiments of the invention, both the image question and the template answer are embedded as metadata within the image.

In one or more embodiments of the invention, the score generator (150) is configured to generate a score reflecting the similarity between a template answer (discussed above) and a test answer provided by a user during authentication. Accordingly, the score may be referred to as a comparison metric. The score may be calculated by (i) identifying words/phrases in the test answer that match words in the template answer, and (ii) summing the points assigned to the identified words/phrases. When the calculated score equals or exceeds a threshold (i.e., satisfies a threshold), the test answer is considered sufficiently similar to the template answer.

In one or more embodiments of the invention, the user profile repository (130) stores one or more user profiles. A user profile may (i) be associated with a user or user group, (ii) reference at least one image in the image repository (120), and/or (iii) pertain to a resource (e.g., a file, an application, a web site, a hardware device, etc.) requiring user authentication prior to granting access. Additional user profiles may be added to the user profile repository (130), while existing user profiles may be modified or deleted.

As discussed above, a user profile may reference multiple images in the image repository (120). In such embodiments, the user profile may also include an ordering of the multiple images. This ordering may be set forth by the user or by a third party (discussed in detail below). The ordering may be, for example, a chronological ordering of the multiple images. Those skilled in the art, having the benefit of this detailed description, will appreciate any ordering of the images may be established.

In one or more embodiments of the invention, a user is associated with multiple user profiles, with each of the multiple user profiles pertaining to a different resource. Those skilled in the art, having the benefit of this detailed description, will appreciate that the requirements for authenticating a user may differ among resources. In other words, some resources may have very strict authentication requirements, with multiple levels of authentication, while other resources may have more lenient authentication requirements, with only a single level of authentication. Accordingly, in one or more embodiments of the invention, each user profile includes the authentication requirements of the resource to which the user profile pertains.

In one or more embodiments of the invention, the authentication engine is configured to authenticate a user based on (i) the authentication requirements of the resource, (ii) the selection of one or more images by the user, (iii) a template answer associated with an image in (ii), and/or (iv) an ordering given to the multiple selected images of (ii) (discussed in detail below). Accordingly, the authentication engine (140) may be configured to collect images from the image repository (120) and present the collected images to the user. The authentication engine (140) may further be configured to obtain a user's selection of an image from the presented collection of images. The authentication engine (140) may also be configured to obtain a test answer generated by a user in response to an image question.

In one or more embodiments of the invention, the management engine (110) provides an interface to the image repository (120), the user profile repository (130), the authentication engine (140), and the score generator (150). The management engine (110) may be configured, using a graphical user interface (GUI) for example, to accept input (e.g., keyboard input, touchscreen input, cursor input, voice commands, etc.) from the user and produce outputs (e.g., on a display screen, printer, audio speakers, etc.).

Figure 2:
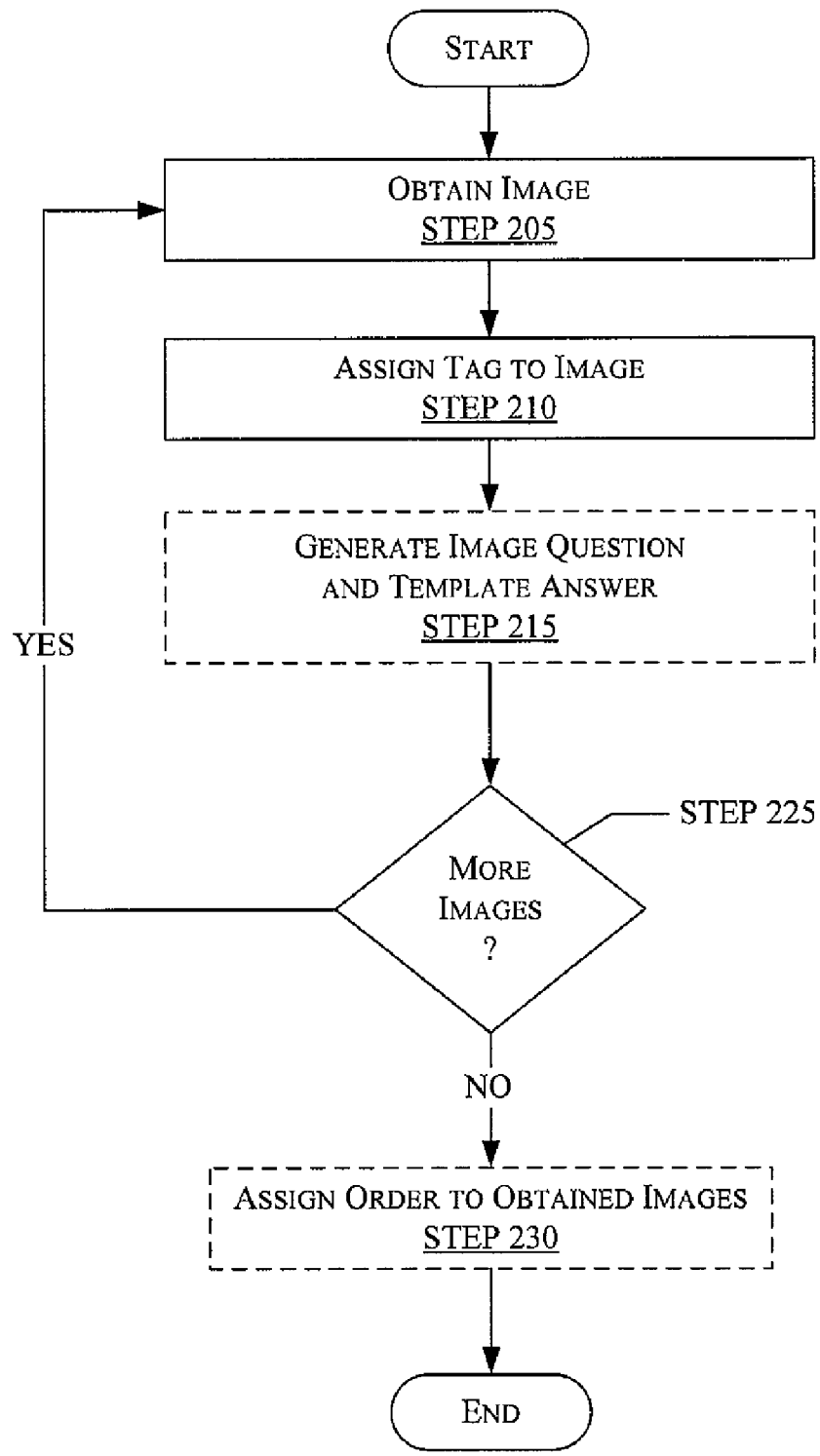
FIG. 2 and FIG. 3 show flowcharts in accordance with one or more embodiments of the invention.

FIG. 2 shows a flowchart in accordance with one or more embodiments of the invention. The process shown in FIG. 2 may be used to create and/or edit a user profile. As discussed above, in addition to being associated with a user or user group, a user profile may also be associated with a resource and the authentication requirements of the resource. Those skilled in the art, having the benefit of this detailed description, will appreciate the order and number of steps shown in FIG. 2 may differ among embodiments of the invention.

In STEP 205, an image is obtained by the potential user or a third party. The image may be a photograph generated by a digital camera, a scanned photograph, a photograph from a web site, a drawing, a motion picture frame, a document page, a slide from a slide show, etc. The image may exist in any file format (e.g., graphic interchange format (GIF), Joint Photographic Experts Group (JPEG), Tagged Image File Format (TIFF), bitmap (BMP), portable document format (PDF), etc.).

In STEP 210, one or more tags are assigned to the obtained image. As discussed above, a tag may be used for categorizing the image. Each tag may describe content presented by the image. In one or more embodiments of the invention, at least one tag is selected from an existing collection of tags. As also discussed above, the tag may be embedded in the obtained image as metadata.

In STEP 215, both an image question and a template answer are generated for the obtained image. As discussed above, the image question may be directed towards the contents and/or characteristics of the obtained image. The image question may be selected from a collection of existing questions, or may be generated by the user for the obtained image.

The template answer may be considered the correct answer to the image question. Generating a template answer may include assigning points to one or more words/phrases deemed essential to correctly answering the image question (discussed in detail above). In one or more embodiments of the invention, STEP 215 is optional based on the authentication requirements of the resource to which the user profile pertains.

In STEP 225, a determination is made whether there exists more images to add to a user profile and/or whether additional images are needed to satisfy the authentication requirements of the resource to which the user profile pertains. When the determination is made no more images exist and/or no further images are needed, the process proceeds to STEP 230. Otherwise, the process proceeds to STEP 205.

In STEP 230, the user or third party assigns an ordering to the obtained images (i.e., STEP 205). The images may be assigned a chronological ordering or any other order deemed suitable to the user or third-party. In one or more embodiments of the invention, STEP 230 is optionally based on the authentication requirements of the resource to which the user profile pertains.

Although the steps in FIG. 2 have been described from a user perspective, those skilled in the art, having the benefit of this detailed description, will appreciate the system (e.g., the backend, the server, etc.) perspective essentially mirrors the steps shown in FIG. 2. For example, in STEP 205, a user may obtain an image. In contrast, the system may receive the obtained image. Similarly, the system may receive the one or more tags assigned to the image, receive both the generated image question and the template answer, and receive the ordering assigned to the images as set forth by the user or third-party. The system may also be used to determine whether more images are required based on the authentication requirements of the resource to which the user profile pertains.

Figure 3:
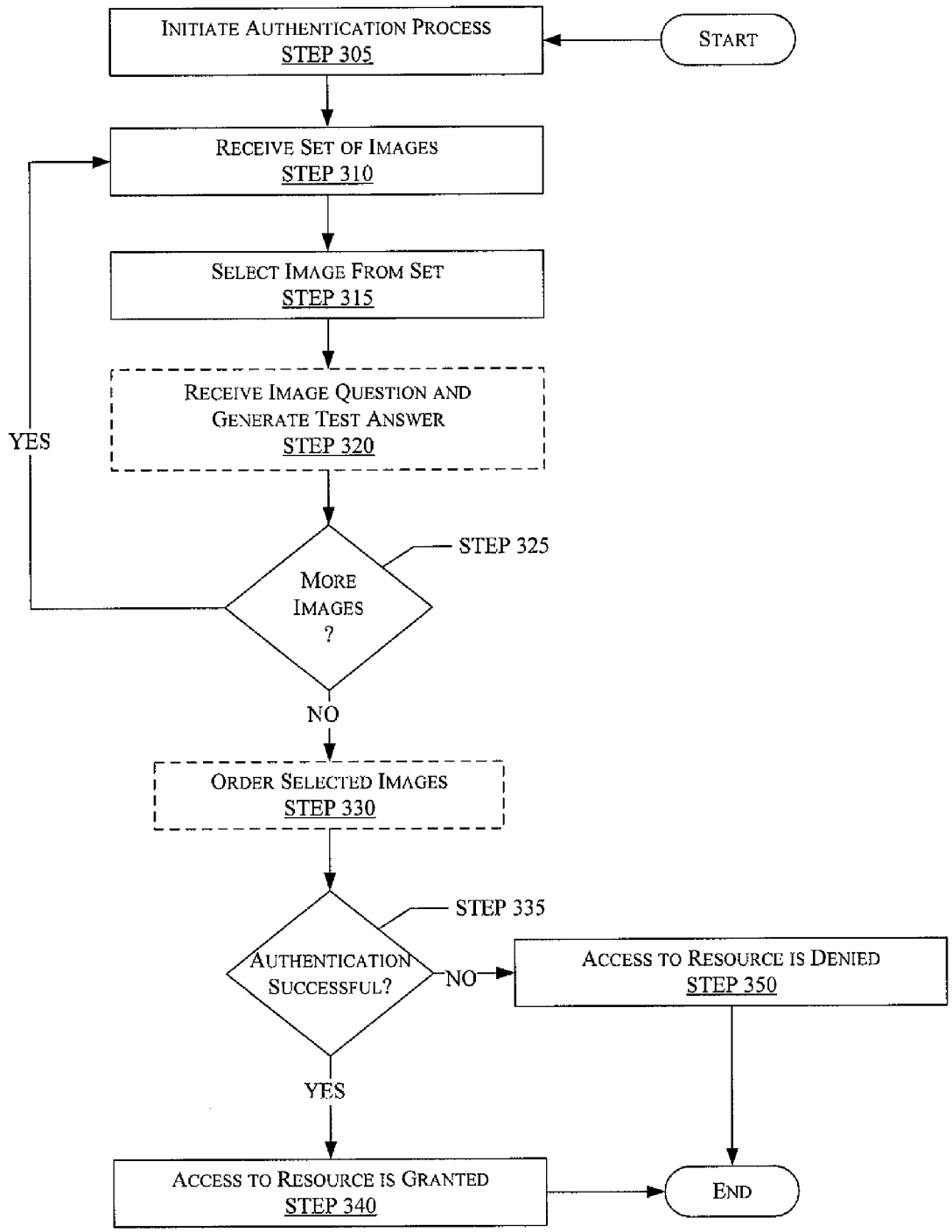

FIG. 3 shows a flowchart in accordance with one or more embodiments of the invention. The process shown in FIG. 3 may be used to authenticate a user prior to granting the user access to a resource. Those skilled in the art, having the benefit of this detailed description, will appreciate the order and number of steps shown in FIG. 3 may differ among embodiments of the invention.

In STEP 305, the user initiates the authentication process. Initiating the authentication process may include providing a login name or other user identification for use in determining the user profile associated with the user. As a user profile may be associated with a specific resource, the resource for which the user is attempting to gain access is also used in determining the user profile.

In STEP 310, the user receives a set of images. In one or more embodiments of the invention, the received set of images includes one or more images referenced by the user's profile. In one or more embodiments of the invention, the received set of images does not include an image referenced by the user's profile. Each image in the received set of images may be similar. In other words, all images in the received set of images may be associated with the same one or more common tags. The one (or more) common tag may be essentially the same tag as an image referenced by the user profile. In one or more embodiments of the invention, all images in the received set of images are selected at random. In other words, there is no common tag associated with each of the images in the received set of images.

In STEP 315, the user selects an image from the set of images (i.e., STEP 310). Specifically, the user is required to select the image that is referenced by the user profile. Those skilled in the art, having the benefit of this detailed description, will appreciate by selecting the correct image (i.e., by selecting the image referenced by the user profile), the user is familiar with the user profile and there exists a high probability that the user is authentic. In one or more embodiments of the invention, when not a single image of the received set of images is referenced by the user profile, the user is required to indicate (e.g., using a GUI component) that none of the received images are associated with the user profile. Those skilled in the art, having the benefit of this detailed description, will appreciate by correctly identifying that none of the received images are associated with the user profile, the user is familiar with the user profile and there exists a high probability that the user is authentic. In one or more embodiments of the invention, the user must make the selection within a short time frame to avoid failing the authentication process (e.g., a timed test).

In STEP 320, once the user has selected an image (i.e., STEP 315), the user receives the image question associated with the image and generates a test answer in response to the image question. Those skilled in the art, having the benefit of this detailed description, will appreciate that by providing a test answer that is essentially the same as the template answer, the user is familiar with the user profile and there exists a high probability the user is authentic. In one or more embodiments of the invention, STEP 320 is optional and depends on the authentication requirements of the resource to which the user is attempting to gain access.

In STEP 325, it is determined whether additional image sets need to be presented to the user. In other words, it is determined whether additional image sets including an image referenced by the user profile are needed to verify the authenticity of the user. In one or more embodiments of the invention, the determination is based on the authentication requirements of the resource. When the determination is made more image sets should be presented to the user, the process returns to STEP 310. When the determination is made, no further image sets need to be presented to the user, the process proceeds to STEP 330.

In STEP 330, the user assigns an order to the selected images. Specifically, the user is required to order the images as specified in the user profile. Those skilled in the art, having the benefit of this detailed description, will appreciate by ordering the selected images as set forth in the user profile, the user is familiar with the user profile and there exists a high probability the user is authentic. In one or more embodiments of the invention, STEP 330 is optional and depends on the authentication requirements of the resource to which the user is attempting to gain access.

In STEP 335, it is determined whether the authentication process is successful. In one or more embodiments of the invention, the authentication process is successful when (i) the user correctly selects images referenced by the user profile from every image set that is presented to the user, (ii) for a given image, the user generates a test answer that is essentially the same (e.g., as dictated by a comparison metric, discussed in detail above) as the template answer associated with said image, and/or (iii) for given selected images, the user assigns an order to said selected images that is essentially the same as the ordering set forth in the user profile. When it is determined that the authentication is successful, the user is granted access to the resource (STEP 340) (e.g., a file, an application, a web site, a hardware device, a physical facility, a safe, a room, a filing cabinet, and/or anything else that needs to be secure). When it is determined that authentication has failed, the user is denied access to the resource (STEP 350).

Although the steps in FIG. 3 have been described from a user perspective, those skilled in the art, having the benefit of this detailed description, will appreciate the system (e.g., the backend, the server, etc.) perspective essentially mirrors the steps shown in FIG. 3. For example, in STEP 305, a user initiates the authentication process. In contrast, the system may receive a request to initiate the authentication process. Similarly, the system sends a set of images, the system receives an image selection, the system sends an image question and receives a test answer, the system receives an ordering of the selected images, the system determines whether the authentication requirements have been satisfied (i.e., whether the authentication process was successful), and the system grants or denies access to the resource.

Still referring to FIG. 3, although STEP 310 recites a set of images, those skilled in the art, having the benefit of this detailed description, will appreciate that a single image may be used instead of a set of images. In such embodiments, STEP 315 and STEP 330 are omitted, and the authentication process is focused on STEP 320.

As discussed above, the authentication requirements may differ among resources (e.g., a file, an application, a web site, a hardware device, a physical facility, a safe, a room, a filing cabinet, and/or anything else that needs to be secure). For example, a first resource may require (i) three image sets be presented to the user, and (ii) the user must correctly identify an image referenced by the user profile for each of the 3 sets. A second resource may require (i) two image sets be presented to the user, (ii) the user must correctly identify an image referenced by the user profile in both image sets, and (iii) the user must generate a test answer that is essentially the same as the template answer for both selected images. Those skilled in the art, having the benefit of this detailed description, will appreciate many other authentication requirement combinations are possible.

Figure 4:
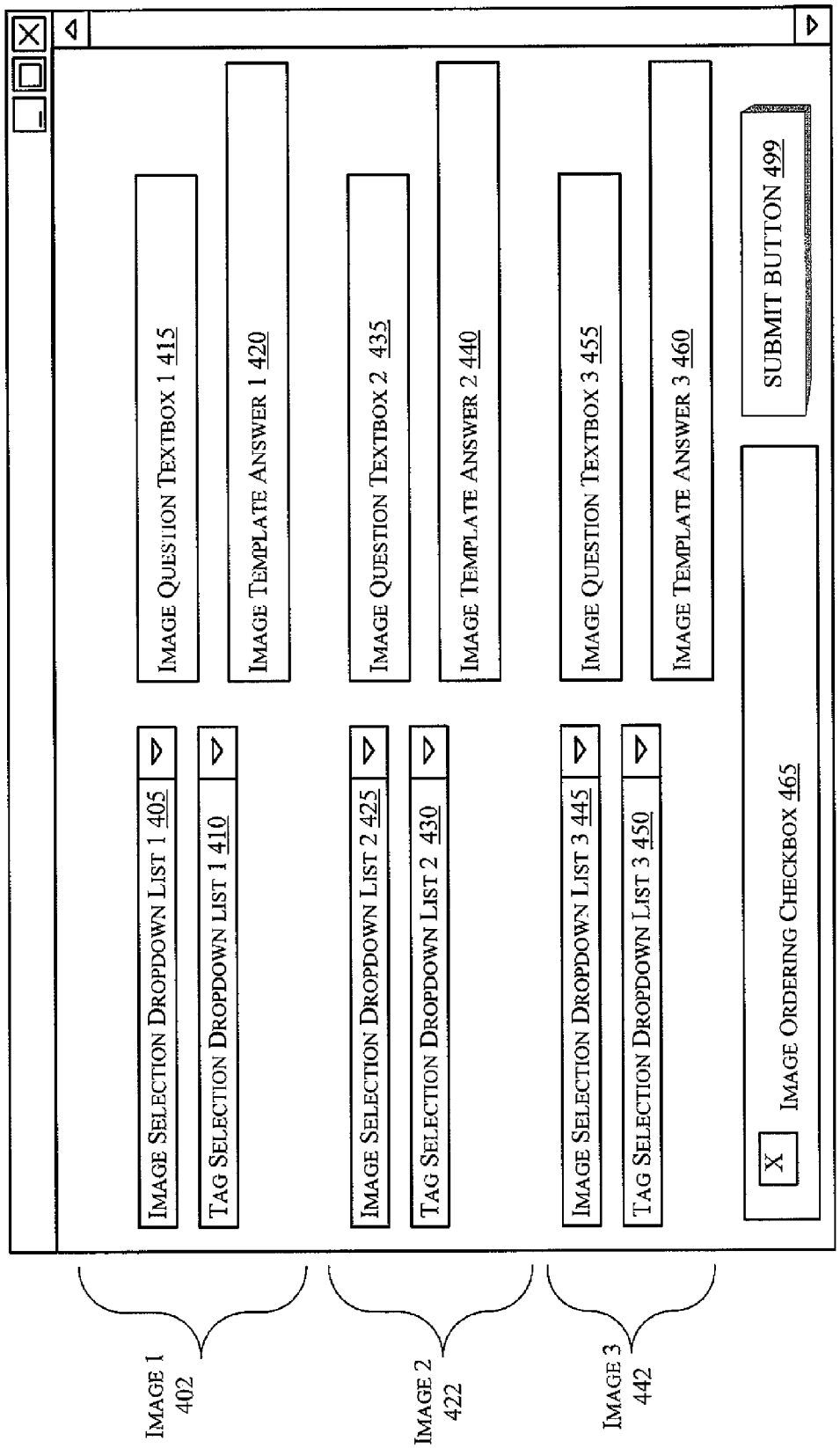
FIG. 4, FIG. 5, and FIG. 6 show examples in accordance with one or more embodiments of the invention.

FIG. 4 shows an example user interface (400) in accordance with one or more embodiments of the invention. The user interface (400) may be used to create and/or edit user profiles. As shown in FIG. 4, the user interface (400) has multiple GUI components including several drop-down lists (i.e., Image Selection Drop-Down List 1 (405), Image Selection Drop-Down List 2 (425), Image Selection Drop-Down List 3 (445), Tag Selection Drop-Down List 1 (410), Tag Selection Drop-Down List 2 (430), Tag Selection Drop-Down List 3 (450)) and several textboxes (i.e., Image Question Textbox 1 (415), Image Template Answer Textbook 1 (420), Image Question Textbox 2 (435), Image Template Answer Textbook 2 (440), Image Question Textbox 3 (455), Image Template Answer Textbook 3 (460)). The GUI components (405, 410, 415, 420) may be associated with a first image (i.e., Image 1 (402)), the GUI components (425, 430, 435, 440) may be associated with a second image (i.e., Image 2 (422)), and the GUI components (445, 450, 455, 460) may be associated with a third image (i.e., Image 3 (442)).

In one or more embodiments of the invention, the image selection drop-down lists (405, 425, 445) are used for identifying an image to be referenced by the user profile. The tag selection drop-down lists (410, 430, 450) may be used to assign one or more predefined tags to each of the identified images. In one or more embodiments of the invention, the image question for each referenced image is generated using image question textboxes (420, 440, 460). Further, the correct answers to the image questions may be generated using the template answer textboxes (420, 440, 460).

In one or more embodiments of the invention, when the user activates the image ordering checkbox (465), the order of the images is included in the user profile. In other words, the user can assign an order to the referenced images by activating the image ordering checkbox (465). When finished completing the user interface (400), the user can select the submit button (499).

Figure 5:
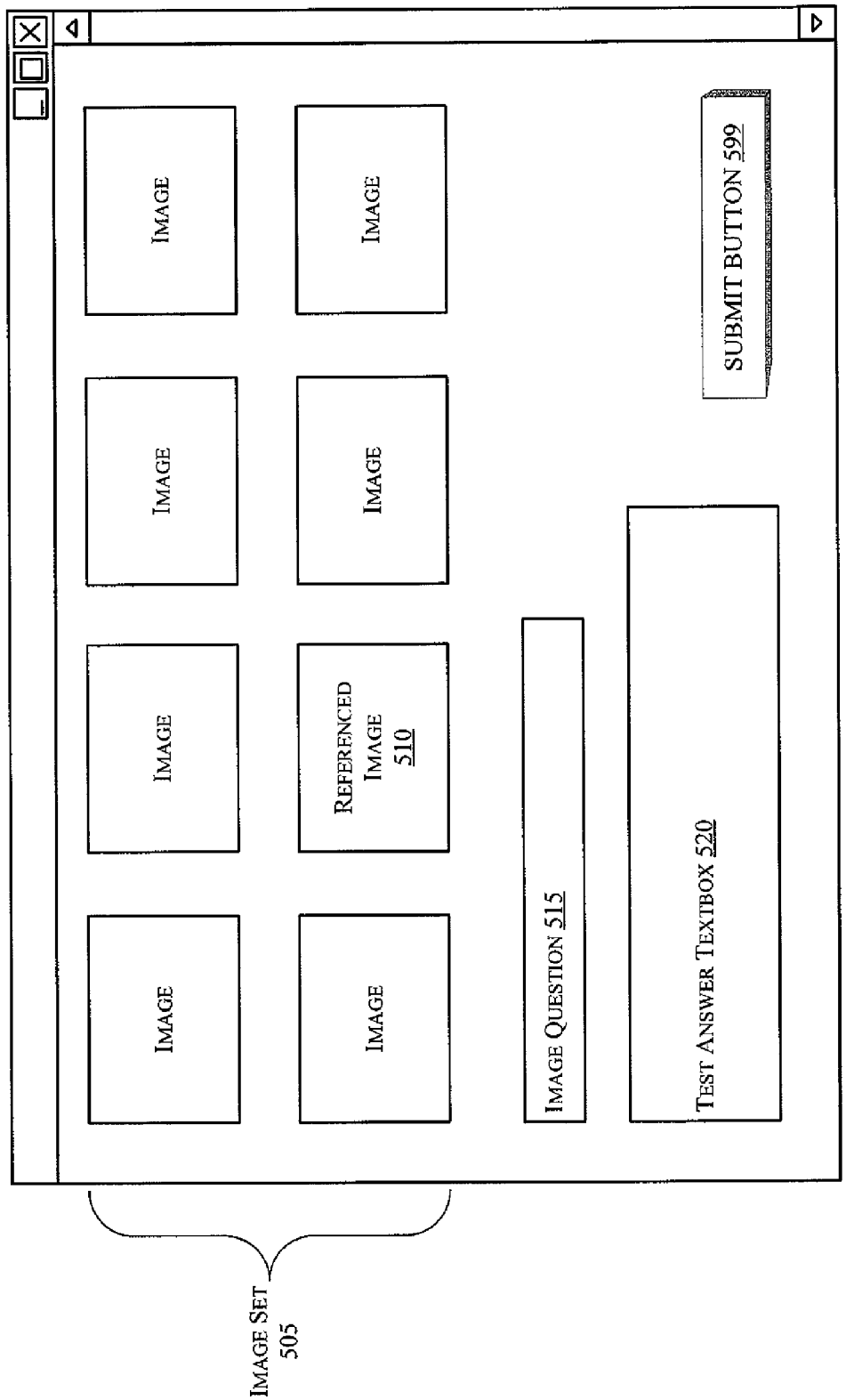

FIG. 5 shows an example user interface (500) in accordance with one or more embodiments of the invention. The user interface (500) may be used for authenticating a user. As shown in FIG. 5, the user interface (500) presents an image set (505) including an image referenced by the user profile (i.e., Referenced Image (510)). In one or more embodiments of the invention, all images in the image set (505) may be associated with at least one common tag. In one or more embodiments of the invention, none of the images in the image set (505) are associated with a common tag (i.e., images in Image Set (505) are randomly selected).

Still referring to FIG. 5, the user interface (500) also presents an image question (515) associated with the referenced image (510) and a textbox for generating a test answer to the image question (i.e., Test Answer Textbox (520)). In one or more embodiments of the invention, the image question (515) is not made visible to the user until the user correctly identifies the referenced image (510). In one or more embodiments of the invention, the image question (515) and the test answer textbox (520) appear together on a new screen once the user has selected an image from the image set (505).

In one or more embodiments of the invention, the user must correctly select the reference image (510) from the image set (505) in order for the authentication process to be successful. In addition, the user may also be required to generate a test answer that is essentially the same as the template answer associated with the image question (515) for authentication to be successful. The need to select images and/or generate test answers is based on the authentication requirements of the resource. The submit button (599) may be selected by the user once the user interface (500) has been completed.

Figure 6:
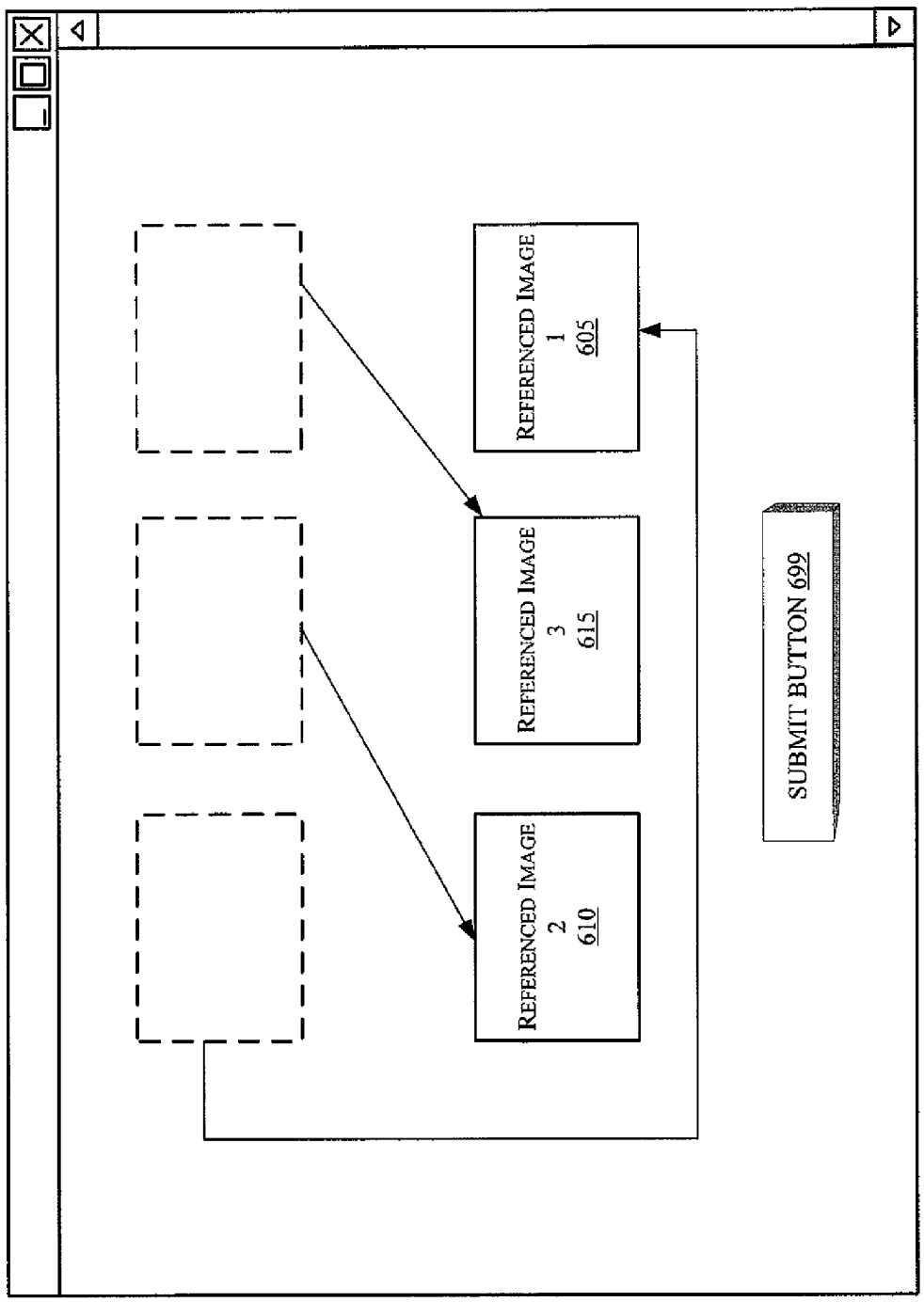

FIG. 6 shows an example user interface (600) in accordance with one or more embodiments of the invention. The user interface (600) may be used to authenticate a user. The user interface (600) presents three images (i.e., Referenced Image 1 (605), Referenced Image 2 (610), Referenced Image 3 (615)). Each of the referenced images has been selected by the user prior to reaching the user interface (600). In other words, referenced image 1 (605) may have been selected by a user when the user was presented with a first image set (e.g., Image Set (505) discussed above in reference to FIG. 5), referenced image 2 (610) may have been selected by a user when the user was presented with a second image set, and referenced image 3 (615) may have been selected by the user when the user was presented with a third image set.

In one or more embodiments of the invention, the resource to which the user is attempting to gain access may require the selected images be ordered as specified in the user profile. Those skilled in the art, having the benefit of this detailed description, will appreciate by assigning an order to the selected images that is essentially the same as the order set forth in the user profile, the user is familiar with the user profile and there exists a high probability the user is authentic.

As shown in FIG. 6, the selected images are originally presented to the user in the following order: Referenced Image 1 (605), Referenced Image 2 (610), and Referenced Image 3 (615). This is not the order set forth in the user profile. Instead, the user orders the selected images as follows: Referenced Image 2 (610), Referenced Image 3 (615), and Referenced Image 1 (605), as shown in FIG. 6. This new order may be the order set forth in the user profile. Once the user had completed user interface (600), the submit button (699) may be selected by the user.

Figure 7:
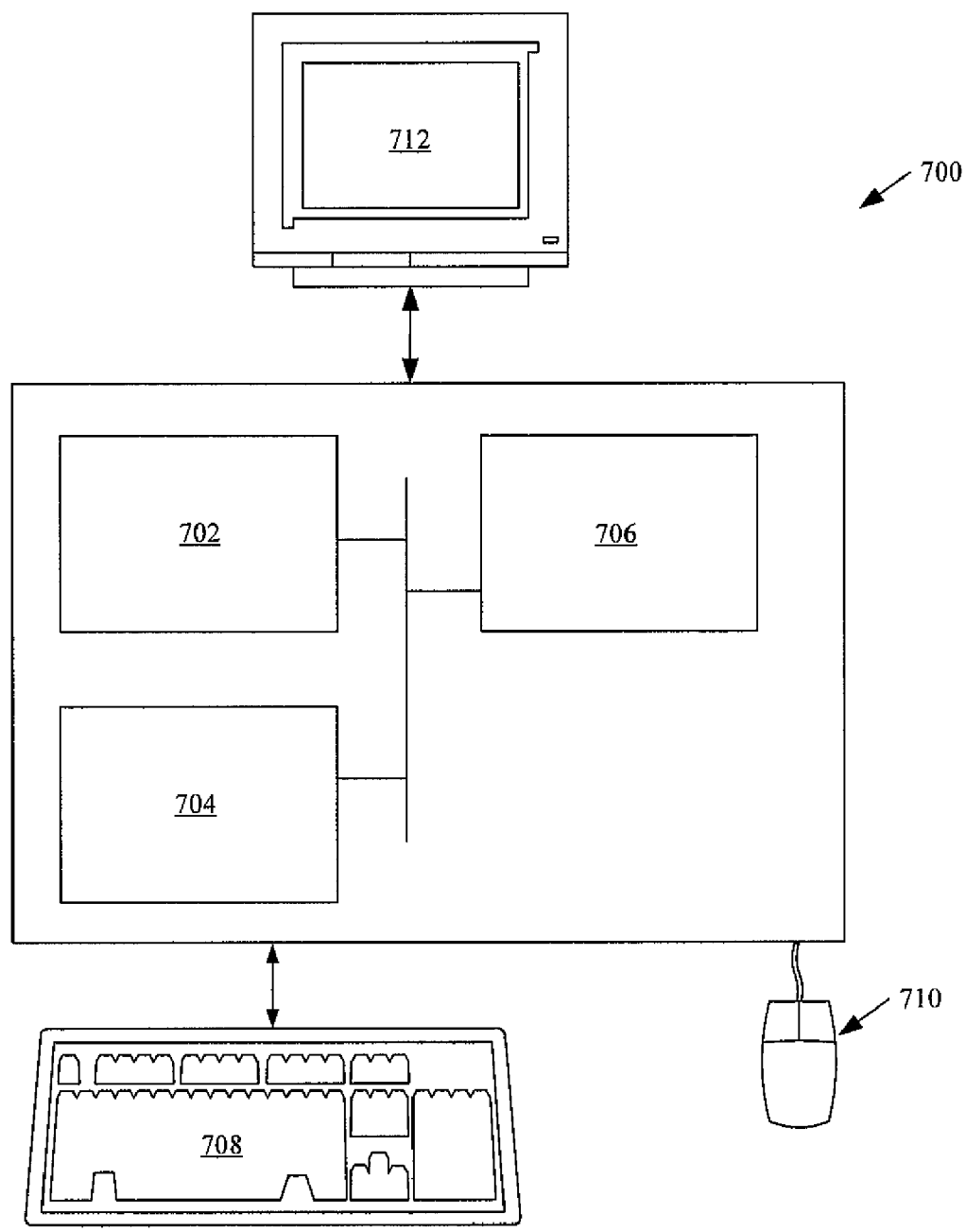
FIG. 7 shows a computer system in accordance with one or more embodiments of the invention.

The invention may be implemented on virtually any type of computer regardless of the platform being used. For example, as shown in FIG. 7, a computer system (700) includes a processor (702), associated memory (704), a storage device (706), and numerous other elements and functionalities typical of today's computers (not shown). The computer (700) may also include input means, such as a keyboard (708) and a mouse (710), and output means, such as a monitor (712). The computer system (700) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (700) may be located at a remote location and connected to the other elements over a network. Further, the invention may be implemented on a distributed system having a plurality of nodes, where each portion of the invention (e.g., image repository (120), authentication engine (140), user profile repository (130)) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of user authentication comprising:
receiving, from a user, a first selection of a first image, wherein the first image is associated with a template answer, wherein the template answer describes information absent from the first image and known to the user, and wherein the template answer comprises a plurality of words each assigned a weight representing relevance to the template answer;
notifying, by a computer processor, a server application of the first selection;
sending, by the computer processor, the template answer to the server application;
sending, after notifying the server application and sending the template answer, a request to the server application to initiate an authentication process;
receiving, after sending the request, a first plurality of images comprising the first image;
displaying the first plurality of images to the user;
receiving, from the user and in response to displaying the first plurality of images, a second selection of the first image from the first plurality of images and a test answer associated with the first image;
notifying, by the computer processor, the server application of the second selection; and
sending, by the computer processor, the test answer to the server application,
wherein the server application calculates a comparison metric by:
identifying a plurality of matching words between the test answer and the template answer; and
summing a plurality of weights corresponding to the plurality of matching words to generate the comparison metric, and
wherein authentication of the user by the server application is based on the second selection and the comparison metric.

2. The method of claim 1, further comprising:
receiving, after sending the request, a second plurality of images associated with the authentication process; and
receiving, from the user, a selection of a second image from the second plurality of images,
wherein authentication of the user by the server application is further based on the selection of the second image, and
wherein the server application is notified of the selection of the second image prior to initiating the authentication process.

3. A method of authenticating a user comprising: receiving, from a user, a first selection of a first image, wherein the first image is associated with a template answer, wherein the template answer describes information absent from the first image and known to the user, and wherein the template answer comprises a plurality of words each assigned a weight representing relevance to the template answer; receiving, after receiving the first selection, a request to authenticate the user; sending, in response to receiving the request, a first plurality of images comprising the first image for display to the user;
receiving, in response to sending the first plurality of images, a second selection of the first image and a test answer associated with the first image from the user;
calculating a comparison metric by:
identifying a plurality of matching words between the test answer and the template answer; and
summing a plurality of weights corresponding to the plurality of matching words to generate the comparison metric; and
authenticating, by a computer processor, the user based on the second selection and the comparison metric.

4. The method of claim 3, further comprising:
receiving the template answer prior to receiving the request to authenticate the user; and
associating the template answer with the first image prior to receiving the request to authenticate the user.

5. The method of claim 3, wherein the test answer is a description of the first image.

6. The method of claim 3, further comprising:
sending, in response to receiving the request, a second plurality of images comprising a second image to the user; and
receiving, from the user and in response to sending the second plurality of images, a selection of the second image, wherein authenticating the user is further based on the selection of the second image.

7. A method of authenticating a user comprising: receiving, from a user, a first selection of a first image;
associating a first template answer with the first image, wherein the first template answer describes information absent from the first image and known to the user, and wherein the first template answer comprises a plurality of words each assigned a weight representing relevance to the first template answer;
receiving, after associating the first template answer with the first image, a request to authenticate the user;
sending, in response to receiving the request, the first image to the user;

receiving, from the user and in response to sending the first image, a test answer associated with the first image;

calculating a comparison metric by:

identifying a plurality of matching words between the test answer and the first template answer; and summing a plurality of weights corresponding to the plurality of matching words to generate the comparison metric; and authenticating, by a computer processor, the user based on the comparison metric.

8. A non-transitory computer readable medium storing instructions to authenticate a user, the instructions comprising functionality to:

receive, from a user, a first selection of a first image, wherein the first image is associated with a template answer, wherein the template answer describes information absent from the first image and known to the user, and wherein the template answer comprises a plurality of words each assigned a weight representing relevance to the template answer; receive, after receiving the first selection, a request to authenticate the user; send, in response to receiving the request, a first plurality of images comprising the first image to the user;

receive, in response to sending the first plurality of images, a second selection of the first image and a test answer associated with the first image from the user;

calculate a comparison metric by:

identifying a plurality of matching words between the test answer and the template answer; and summing a plurality of weights corresponding to the plurality of matching words to generate the comparison metric; and authenticate, by a computer processor, the user based on the second selection and the comparison metric.

9. The non-transitory computer readable medium of claim 8, the instructions further comprising functionality to:

receive the template answer prior to receiving the request to authenticate the user; and associate the template answer with the first image prior to receiving the request to authenticate the user.

10. The non-transitory computer readable medium of claim 8, wherein the test answer is a description of the first image.

11. The non-transitory computer readable medium of claim 8, the instructions further comprising functionality to:

send, in response to receiving the request, a second plurality of images comprising a second image to the user; and receive, from the user and in response to sending the second plurality of images, a selection of the second image, wherein authenticating the user is further based on the selection of the second image.

12. A system for authenticating a user comprising: a computer processor; a memory; an image repository configured to receive a first selection of a first image from a user, wherein the first image is associated with a template answer wherein the template answer describes information absent from the first image and known to the user, wherein the template answer comprises a plurality of words each assigned a weight representing relevance to the template answer; and an authentication engine residing in the memory, executing on the computer processor, operatively connected to image repository, and configured to: receive, after receiving the first selection, a request to authenticate the user; send, in response to receiving the request, a first plurality of images comprising the first image to the user;

receive, in response to sending the first plurality of images, a second selection of the first image and a test answer associated with the first image from the user; calculate a comparison metric by:

identifying a plurality of matching words between the test answer and the template answer; and summing a plurality of weights corresponding to the plurality of matching words to generate the comparison metric;

and authenticate the user based on the second selection and the comparison metric.

13. The system of claim 12, wherein the authentication engine authenticates the user further based on receiving, from the user, a selection of a second image from a second plurality of images.

14. The method of claim 1, wherein each of the first plurality of images are associated with a common tag.

15. The method of claim 1, wherein the test answer is a description of the first image.

16. The method of claim 2, further comprising:

assigning, prior to sending the request, an order to the first image and the second image; and identifying the order after receiving the selection of the second image, wherein authenticating the user is further based on identifying the order.

17. The method of claim 3, further comprising:

receiving, prior to receiving the request to authenticate the user, a tag associated with the first image, wherein each of the first plurality of images is associated with the tag.

18. The method of claim 6, further comprising:

receiving, from the user and prior to receiving the request, assignment of an order to the first image and the second image; and receiving the order from the user after selection of the second image, wherein authenticating the user is further based on receiving the order.

19. The non-transitory computer readable medium of claim 8, the instructions further comprising functionality to:

receive a tag associated with the first image prior to receiving the request to initiate the authentication process, wherein each of the first plurality of images is associated with the tag.

20. The method of claim 7, further comprising:

receiving a selection of a second image from the user;

receiving, from the user and prior to receiving the request, assignment of an order to the first image and the second image;

sending, in response to receiving the request, the second image to the user; and receiving the order from the user after sending the second image, wherein authenticating the user is further based on receiving the order.

21. The non-transitory computer readable medium of claim 11, the instructions further comprising functionality to:

receive, from the user and prior to receiving the request, assignment of an order to the first image and the second image; and receive the order from the user after selection of the second image, wherein authenticating the user is further based on receiving the order.

22. The system of claim 12, wherein the image repository is further configured to receive a selection of a second image from a user, and wherein the authentication engine is further configured to:

receive, from the user and prior to receiving the request, assignment of an order to the first image and the second image;

send, in response to receiving the request, the second image to the user; and receive the order from the user after sending the second image, wherein authenticating the user is further based on receiving the order.

23. The system of claim 12, wherein the first image is associated with a tag prior to receiving the request to authenticate the user and each of the first plurality of images is associated with the tag.

24. The system of claim 12, further comprising:

a comparison generator operatively connected to the authentication engine and configured to generate a comparison of a test answer provided by the user and a template answer received prior to receiving the request, wherein the authentication engine authenticates the user further based on the comparison.

\* \* \* \* \*